United States Patent [19]

Yokose

[11] Patent Number: 4,699,563
[45] Date of Patent: Oct. 13, 1987

[54] HORIZONTAL ARTICULATED ROBOT
[75] Inventor: Kazutoshi Yokose, Tokyo, Japan
[73] Assignee: Seiko Instruments & Electronics Ltd., Tokyo, Japan
[21] Appl. No.: 738,091
[22] Filed: May 24, 1985
[30] Foreign Application Priority Data May 31, 1984 [JP] Japan .............................. 59-82819[U]
Jun. 4, 1984 [JP] Japan .............................. 59-82819[U]

[51] Int. Cl.⁴ ............................................... B25J 3/00
[52] U.S. Cl. .................................. 414/744 A; 901/15; 901/19
[58] Field of Search ....................... 901/15, 23, 24, 25, 901/28; 414/744 R, 744 A, 744 B, 744 C; 74/640

[56] References Cited
U.S. PATENT DOCUMENTS 3,007,097 10/1961 Shelley et al. ................... 901/23 X
4,552,505 11/1985 Gorman ........................... 901/23 X
4,557,662 12/1985 Terauchi et al. ................. 901/23 X
4,637,776 1/1987 Saito ................................ 414/744 B

FOREIGN PATENT DOCUMENTS 2145053 3/1985 United Kingdom ................. 901/15

Primary Examiner—Robert J. Spar
Assistant Examiner—Lyle Kimms
Attorney, Agent, or Firm—Bruce L. Adams; Van C. Wilks

[57] ABSTRACT

A robot comprises a plurality of arms connected in series and articulated with one another so as to cooperatively move along a horizontal plane. A plurality of drive units are connected to rotate one arm relative to another around respective vertical axes. Each drive unit has an outer cylindrical frame from which one arm horizontally extends, and an inner cylindrical bracket from which another arm horizontally extends, the inner cylindrical bracket being coaxially disposed within and rotatable relative to the outer cylindrical frame. A drive motor is fixedly mounted within the inner cylindrical bracket and has a rotatable output shaft extending along the vertical axis. A reduction gear unit is interconnected between the drive motor output shaft and the inside of the outer cylindrical frame and transmits the rotational movement of the output shaft to the inner cylindrical bracket at a reduced rate so that the inner cylindrical bracket rotates around the vertical axis relative to the outer cylindrical frame.

20 Claims, 3 Drawing Figures

HORIZONTAL ARTICULATED ROBOT

BACKGROUND OF THE INVENTION

This invention relates to the improvement in robots such as a horizontal multi-articulated robot, a cylindrical cordinate type robot or the like which are provided with a horizontal rotation axis.

Hereinafter, the invention is described taking example by a horizontal multi-articulated robot.

Since a gripper member provided on an arm nose has some flexibility horizontally, a horizontal articulated robot is used generally for an apparatus for feeding a bolt by placing the bolt in a tapped hole which guides the bolt horizontally. However, in a conventional apparatus, a strut for supporting the dead weight of a first arm is provided along a first rotation axis (Z-axis), and therefore the first arm comes to abut with the strut and thus the first arm can not be driven up to 360° around the Z-axis. Further, a motor and a reduction gear are so projected upwardly from an upper portion of the arm that they are in danger of interfering with other structures.

Besides, a conventional robot of this kind lacks a side mounting/fixing part, therefore an installation of an additional robot or a bench or the like, is carried out only by mounting them directly on a floor.

Therefore, since a bench and the like are fixed on a floor or a base plate, these are positioned relative to the robot through the floor or the base plate, thereby it is difficult to ensure accuracy of position. Moreover, the robot and the bench must be respectively provided with a mounting member and it causes to incur a cost so much.

SUMMARY OF THE INVENTION

This invention has been made so as to solve the above-mentioned problems and its object is to provide an apparatus having an extensive operating range without impairing the feature as a horizontal articulated robot the apparatus comprises a motor and a reduction gear incorporated at the center of a portion for rotating a first arm, thereby preventing an interference with other structures and also driving the first arm up to 360° around the Z-axis.

Besides, another object is to prevent the articulated portion of the robot from an oil-leakage by arranging an oil-seal member between a motor shaft and a reduction gear.

Further, another object is to provide a horizontal articulated robot ready for mounting and fixing a bench and the like on a side thereof by providing a mounting/fixing part capable of mounting a bench and the like on the front of a base frame.

BRIEF DESCRIPTION OF THE DRAWINGS

Each of figures shows an embodiment of the invention respectively.

DETAILED DESCRIPTION OF THE INVENTION

Figure 1:
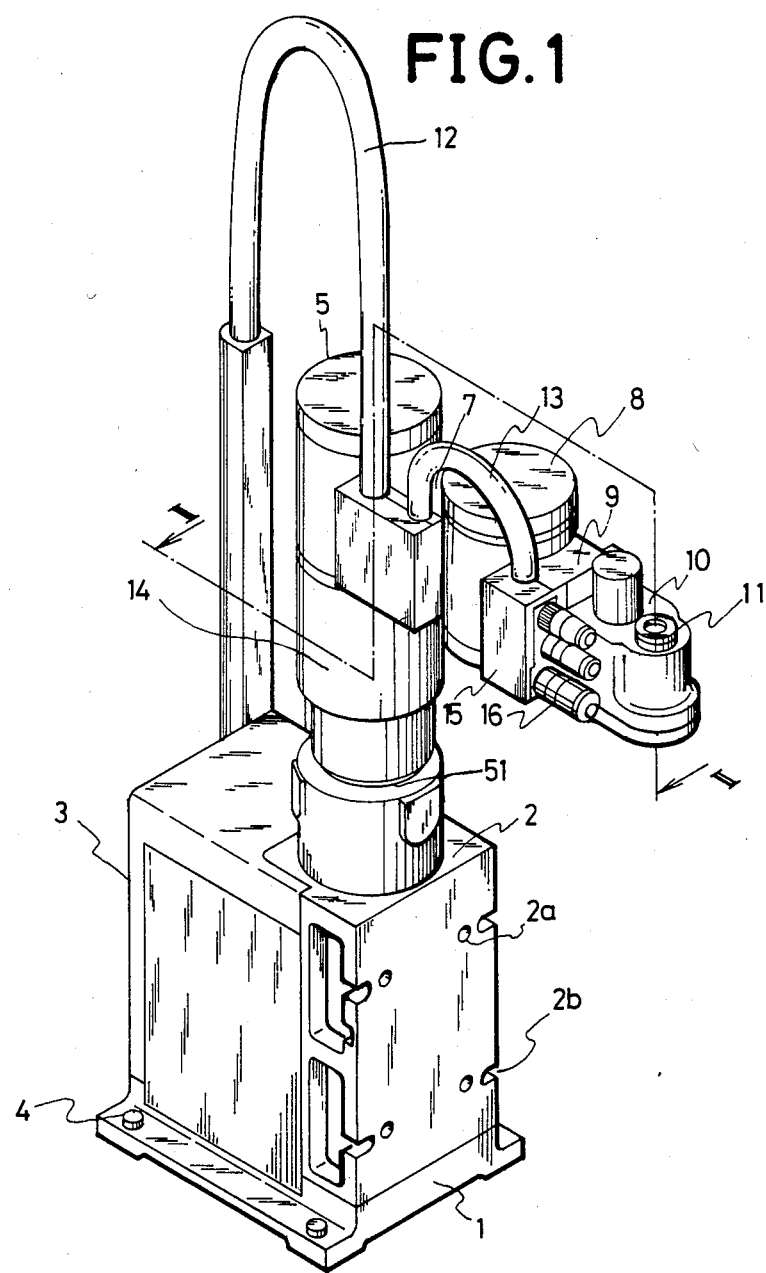
FIG. 1 illustrates a perspective view of a horizontal articulated robot of this invention.

The whole constitution is illustrated in FIG. 1, wherein 1 denotes a pedestal, 2 denotes a Z-axial frame fixed on the pedestal 1, 3 denotes a cover for protecting the Z-axial frame 2 and fixed on the pedestal 1, these forming a solid structure to constitute a base frame. Mounting/fixing parts 2a, 2b for mounting a bench and the like which will be described later, are formed on a front side of the Z-axial frame 2. Then, 2a denotes a tapped hole, and 2b denotes a notch for inserting a bolt and nut, each being selected properly to fit the equipment to be mounted. A reference numeral 4 denotes a bolt for fixing the pedestal 1 on a floor or a base plate (not shown), 5 denotes a first articulated portion, 7 denotes a first or intermediate arm which is turned by the incorporated motor, 9 denotes a second or top arm which is turned by the incorporated motor, 10 denotes a gripper holder fixed on a rotating end or free distal end of the second arm 9, and 11 denotes a cylindrical holding member which is driven so as to rotate by the motor incorporated in the gripper holder 10. A gripper described later is fixed on a lower end of the holding member 11. Besides, 12 and 13 denote spiral tubes respectively, 14 denotes a cord box, 15 denotes a connector box, 16 denotes a connector which is an auxiliary means for inputting or distributing the control signal.

Figure 2:
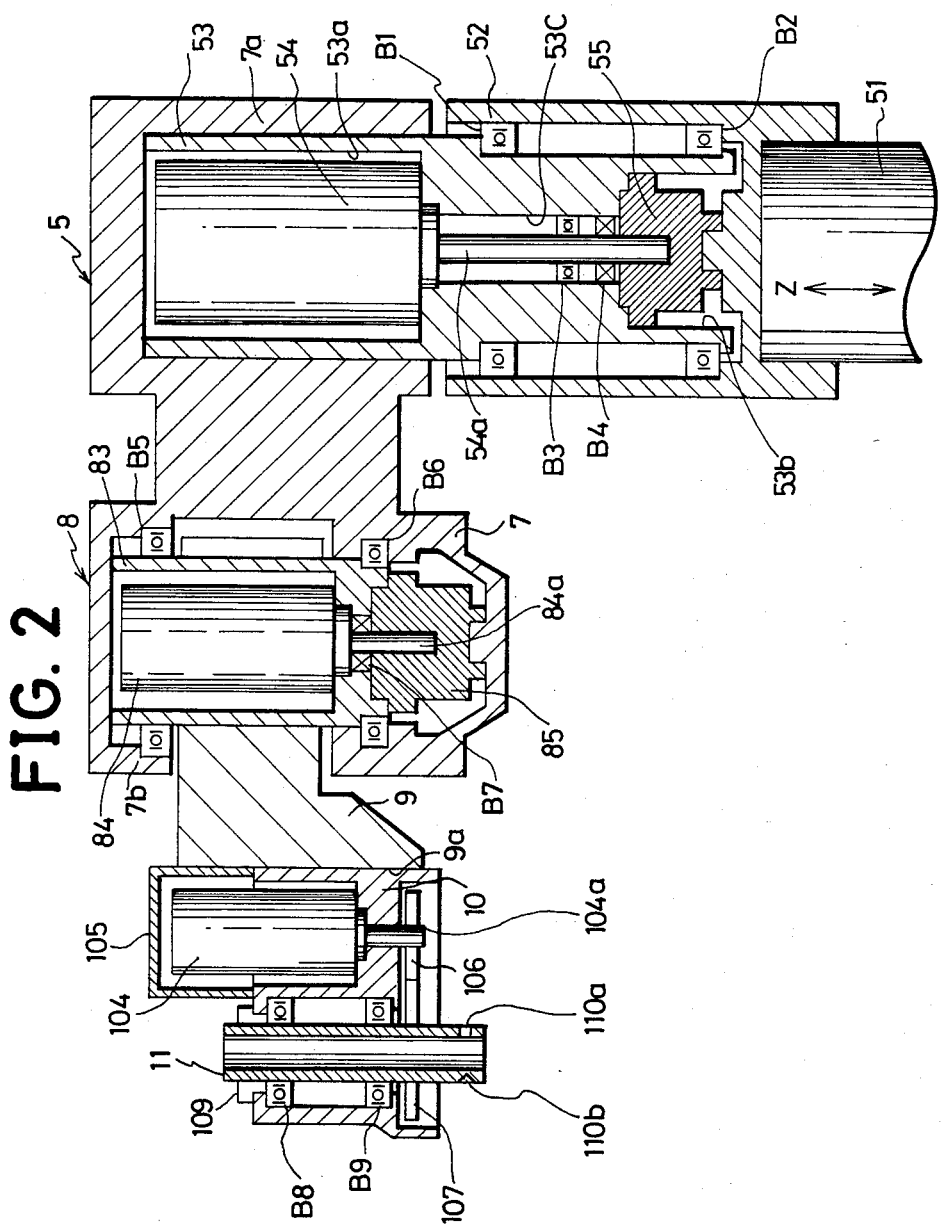
FIG. 2 illustrates a partially shown cross-sectional view taken along II—II line of FIG. 1 in order to show a main part of the apparatus of this invention.

Next, the driving part, which is a main part of this invention, is described with reference to FIG. 2 which is a cross-sectional developed view taken along II—II line of FIG. 1.

In the drawing, a reference numeral 5 denotes the first articulated portion including drive means, 51 denotes a Z-axial slide shaft driven along the arrow mark of Z-direction by a rack and pinion, ball screw and the like provided on a base (not shown), 52 denotes an outer cylindrical frame with its bottom end being fixed on an upper portion of the Z-axial slide shaft 51, 53 denotes a first inner bracket incorporated rotatably in the frame 52 through bearings B1 and B2, 54 denotes a solid motor enclosed in and fixed to a cavity defined by a motor enclosure or upper portion 53a of the first bracket 53 and provided with an rotative output shaft 54a extending downward along a vertical axis, and 55 denotes first reduction gear means positioned below the motor 54, fixed to the frame 52 at an output portion thereof, and provided slidably in a reduction gear enclosure 53b or lower portion of the first bracket 53. A nose of the output shaft 54a of the motor 54 is connected to an input portion of the first reduction gear means 55 and the shaft 54a is inserted in a through-hole 53c of the first bracket 53 through a bearing B3. Accordingly, the first bracket 53 rotates relative to the outer cylindrical frame 52 according to a rotation of the output shaft 54a around the vertical axis in the same rotational direction as the shaft 54a at a reduced angular velocity according to a reduction ratio of the first reduction gear means 55. A reference character B4 denotes an oil seal for preventing an oil leak from the reduction gear 55. A reference numeral 7 is a first arm which horizontally extends from the cylindrical frame 7a, and is rotatable around the vertical rotation axis of the first articulated portion or drive means 5 and of which the cylindrical end portion 7a is coaxially fitted with the outer perimeter of the first bracket 53. At the end of the first arm 7, a second articulated portion 8 including second drive means is arranged. Reference numeral 83 denotes a second inner bracket enclosed rotatably in the cylindrical end portion or outer cylindrical frame 7b of the first arm 7 through bearings B5 and B6. Reference numeral 84 denotes a motor enclosed in and fixed to the second bracket 83 and provided with an output shaft 84a extending downward along a vertical axis, 85 denotes second reduction gear means positioned below the motor 84, and enclosed in and fixed to the cylindrical end portion 7b of the first arm 7 at an output portion thereof, and a nose of the shaft 84a of the motor 84 is connected to an input portion of the second reduction gear means 85. Accordingly, the second bracket 83 rotates relative to the cylindrical end portion 7b around the vertical axis, as in the case of the first bracket 53, according to a rotation of the motor shaft 84a in the same rotational direction as the motor shaft 84a disposed in the cylindrical end portion 7b of the first arm, and at a reduced angular velocity according to a reduction ratio of the second reduction gear means 85. A reference character B7 denotes an oil seal for preventing an oil leak from the reduction gear means 85. A reference numeral 9 denotes a second arm with its one end being horizontally fixed on an outer perimeter of the second bracket 83 which rotates around the vertical motor shaft 84a. A reference numeral 10 is a gripper holder for holding a gripper, which is secured on the end portion 9a of the second arm 9. Reference numeral 104 denotes a motor enclosed in and fixed to the gripper holder 10, 105 denotes a motor cover provided on the gripper holder 10, and 106 denotes a gear fixed to a nose of a motor shaft 104a. A reference numeral 11 denotes a cylindrical holding member enclosed rotatably in the gripper holder 10 through bearings B8 and B9. A reference numeral 109 denotes a vertical guiding flange provided on an upper end of the cylindrical holding member 11, 107 denotes a gear fixed to a lower end portion of the cylindrical holding member 11 and constituting a third reduction gear train through engaging with the gear 106. Reference numerals 110a and 110b denotes a concavity and a tapped hole respectively for screwing outside or inside of a gripper (not shown) formed on the lower end portion of the cylindrical holding member 11. Not so indicated, but angle detectors (a rotary encoder, for example) and drive controlling cables are connected to upper portions of the motors 54, 84 and 104.

Figure 3:
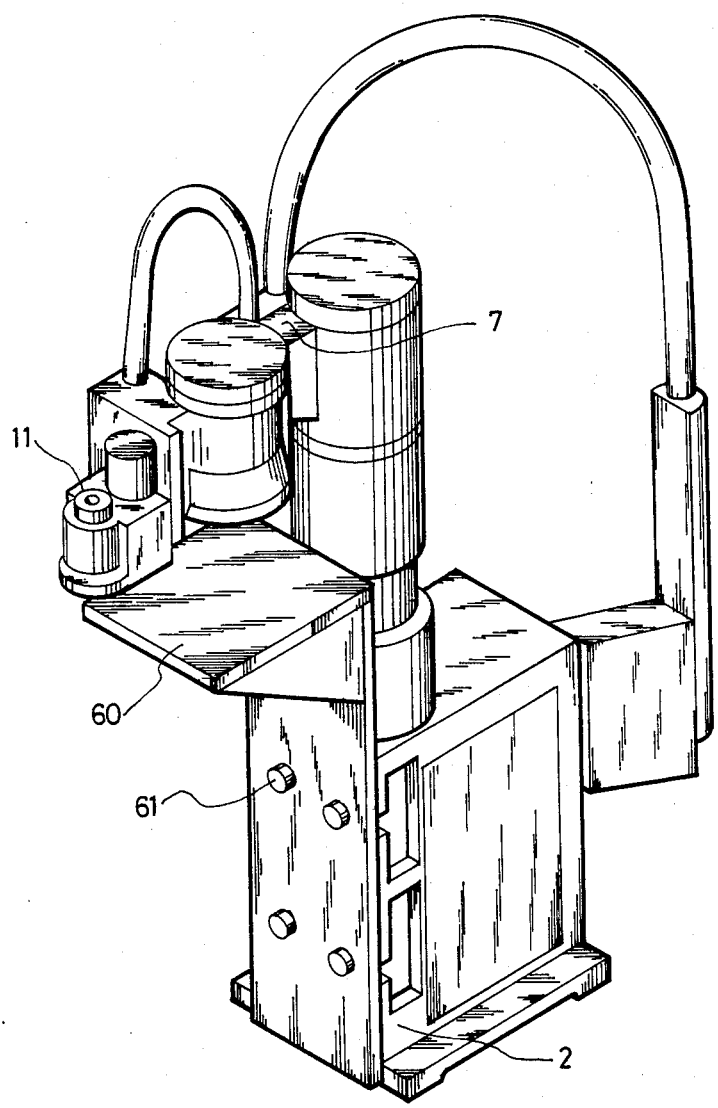
FIG. 3 illustrates a perspective view to show a further improved apparatus of this invention.

Further, FIG. 3 illustrates a further improved embodiment. The figure represents a state wherein a bench 60 is fixed to a side of the Z-axial frame 2 through a bolt 61. In this case, the bolt 61 can be fastened directly in the tapped hole 2a shown in FIG. 1. If the bench 60 is fixed directly to a side of the base frame, a position of the bench 60 relative to the robot body becomes accurate and a desired sequence driving of the gripper is effected accurately.

Operation of the robot will be taken up, next, for description.

First, for inputting a desired sequence, the cylindrical holding member 11 is moved manually by means of a controller (not shown) such as a keyboard or the like. In this case, a cartesian coordinate system or an orthogonal cordinate system is employed for the movement of the robot hand to a predetermined position. Namely, either a cartesian coordinate system or an orthogonal coordinate system will be selected therefore by changing a switch on the controller. After the desired sequence has been input, a gripper is mounted on a lower end portion of the cylindrical holding member 11. Next, a desired working or assembling will be carried out through the sequential driving actually.

The gripper is driven and so rotated by the third motor 104 and can be set to a desired direction.

As described above, according to this invention, since the construction is such that the motor is incorporated in the center of the articulated portion of the first arm which can be driven up to 360° around the Z-axis along a horizontal plane, there may be realized a horizontal articulated robot having extensive operating range without interfering with other structures.

Besides, since an oil seal member is arranged on the motor shaft on the upper of the reduction gear, an oil leakage can be eliminated.

Furthermore, since a mounting/fixing part for mounting other robots is formed on a side of the base frame, the gripper to work as a manipulation means of the robot can be located accurately with respect to a workpiece, and thus machining, assembly and conveyance can be performed at high precision. Further, since it can be fixed directly on the robot, an industrial robot in which a mounting structure is simplified and a reduction in cost is attained can be provided.

What is claimed is:

1. A robot having a plurality of movable members rotatively articulated with one another to undergo rotational movement around vertical axes, comprising: a plurality of drive means for rotating one of the movable members relative to another of the movable members around vertical axes, each of the drive means comprising a cylindrical frame disposed at an end portion of one of the movable members and being aligned with the vertical axis of the drive means, a bracket having a cavity therein and disposed at an end portion of another of the movable members, the bracket being coaxially and rotatably disposed within the cylindrical frame, a motor fixedly mounted within the cavity and having a rotatable output shaft extending along the vertical axis, reduction gear means having an input portion fixed to the output shaft and an output portion fixed to the cylindrical frame for transmitting the rotational movement of the output shaft to the bracket at a reduced rate, and oil sealing means slideably disposed around the output shaft and fixed to the inner surface of the bracket, the oil sealing means being positioned between the motor and the reduction gear means for preventing oil leakage from the reduction gear means; and another movable member comprising an arm horizontally extending from the bracket so that the arm rotates around the vertical axis along a horizontal plane.

2. A robot as set forth in claim 1; wherein the plurality of drive means include first and second drive means, the plurality of movable members include first and second arms articulated with one another, one end of the first arm being connected to the bracket of the first drive means and the other end of the first arm being connected to the cylindrical frame of the second drive means, and one end of the second arm being connected to the bracket of the second drive means so that the first and second arms are articulated with one another to cooperatively move along the horizontal plane, and the robot further includes a gripper device disposed at the other end of the second arm for grasping a workpiece.

3. A robot as set forth in claim 2; wherein the gripper device comprises a motor having a shaft along a vertical axis, a gripper holding member rotatively disposed adjacent to the shaft, and a reduction gear train engaged between the shaft and the gripper holding member.

4. A robot comprising: a plurality of drive means separately disposed along a horizontal plane and having vertical axes, each of the drive means comprising an outer frame having an axis thereof extending along the vertical axis of the drive means, an inner bracket having means defining a cavity therein and being coaxially and rotatably disposed within the outer frame, a motor fixedly mounted within the cavity and having a rotative shaft extending along the vertical axis of the drive means inside of the outer frame, and reduction gear means having an input portion fixed around the rotative shaft and an output portion fixed to the inside of the outer frame for mechanically transmitting the rotational movement of the rotative shaft to the inner bracket at a reduced rate so that the inner bracket rotates around the vertical axis relative to the outer frame; and a plurality of arms connected in series and rotatably articulated with one another at the plurality of the drive means, one end of each of the arms extending horizontally from the inner bracket of one of the drive means so that the plurality of arms cooperatively move along the horizontal plane.

5. A robot as set forth in claim 4; wherein the plurality of arms includes a top arm having a distal end, and one intermediate arm connected between a pair of neighboring drive means.

6. A robot as set forth in claim 5; including manipulating means disposed at the distal end of the top arm for manipulating a workpiece.

7. A robot as set forth in claim 6; wherein the manipulating means comprises a gripper device for grasping the workpiece.

8. A robot as set forth in claim 7; wherein the gripper device comprises a motor having a shaft along a vertical axis, a gripper holding member rotatably disposed adjacent to the shaft, and a reduction gear train engaged between the shaft and the gripper holding member.

9. A robot as set forth in claim 4; wherein the outer frame comprises a cylindrical frame having a bottom plate and a top opening for receiving therein the inner bracket.

10. A robot as set forth in claim 9; wherein the inner bracket comprises a cylindrical bracket coaxially disposed in the cylindrical frame.

11. A robot as set forth in claim 10; including bearing means disposed between the cylindrical frame and the cylindrical bracket for rotatably supporting the cylindrical bracket.

12. A robot as set forth in claim 10; wherein the cylindrical bracket comprises an upper portion for receiving therein the motor and a lower portion inserted into the cylindrical frame.

13. A robot as set forth in claim 12; wherein the rotative shaft of the motor extends downwards toward the bottom plate of the cylindrical frame through the lower portion of the cylindrical bracket.

14. A robot as set forth in claim 13; wherein the output portion of the reduction gear means is disposed on the bottom plate of the cylindrical frame.

15. A robot as set forth in claim 4; including oil sealing means slideably disposed around the rotative shaft of the motor and disposed between the motor and the reduction gear means for preventing oil leakage from the reduction gear means.

16. A robot as set forth in claim 14; including oil sealing means disposed between the rotative shaft and the inner surface of the lower portion of the cylindrical bracket for preventing oil leakage from the reduction gear means.

17. A robot as set forth in claim 4; wherein the plurality of drive means comprise first and second driving means; and the plurality of arms comprise first and second arms, the first arm extending between the first and second driving means, the second arm extending from the second driving means.

18. A robot as set forth in claim 17; wherein one end of the first arm is connected to the inner bracket of the first driving means and the other end of the first arm is connected to the outer frame of the second driving means, and one end of the second arm is connected to the inner bracket of the second driving means and the other end of the second arm is free.

19. A robot as set forth in claim 18; including manipulating means disposed at the free end of the second arm for manipulating a workpiece.

20. A robot as set forth in claim 18; including a slide shaft connected to the outer frame of the first driving means for driving the first driving means in a direction perpendicular to the horizontal plane.

* * * * *